US005637325A

United States Patent [19]

[11] Patent Number: 5,637,325

[45] Date of Patent: Jun. 10, 1997

Greene et al.

[54] METHOD AND APPARATUS FOR REPAIRING DAMAGED FILM END

[75] Inventors: William J. Greene, Webster; Dennis F. Tianello, Spencerport, both of N.Y.

[73] Assignee: Eastman Kodak Company, Rochester, N.Y.

[21] Appl. No.: 447,130

[22] Filed: May 22, 1995

[51] Int. Cl.[6] ............................ B32B 35/00; G03D 15/04

[52] U.S. Cl. ............................... 425/11; 156/98; 156/527; 425/12; 428/63

[58] Field of Search ............................... 156/94, 98, 505, 156/506, 527, 157; 29/402.11; 425/11, 12; 269/1, 54.5, 900; 428/63, 343

[56] References Cited

U.S. PATENT DOCUMENTS

| | | | |
|---|---|---|---|
| 1,310,215 | 7/1919 | Schneider | 156/505 |
| 2,176,507 | 10/1939 | Nagel . | |
| 2,565,009 | 8/1951 | Wallingsford | 156/505 |
| 2,833,350 | 5/1958 | Merkur . | |
| 2,923,195 | 2/1960 | Reibel et al. . | |
| 3,184,356 | 5/1965 | Jackman et al. . | |
| 3,233,489 | 2/1966 | Quarve | 156/505 |
| 3,274,687 | 9/1966 | Le Blanc . | |
| 3,461,022 | 8/1969 | Jorgensen | 156/505 |
| 3,622,425 | 11/1971 | Savarick | 156/505 |
| 3,959,048 | 5/1976 | Stanfield et al. . | |
| 4,046,615 | 9/1977 | Jansen . | |
| 4,235,660 | 11/1980 | Rodriguez . | |
| 4,249,985 | 2/1981 | Stanfield . | |
| 5,078,828 | 1/1992 | Marglin | 156/505 |

*Primary Examiner*—Daniel Stemmer
*Attorney, Agent, or Firm*—Frank Pincelli

[57] ABSTRACT

A film strip with a damaged end portion is repaired by using jig means for severing the strip at a fixed distance from a pre-existing locating hole to remove the damaged end portion and then attaching a pre-formed replacement end member in the same location by reference to the same locating hole. The replacement end member has the same edge configuration and hole features as the original film end portion and overlaps the severed film end to permit it to be adhesively bonded thereto.

7 Claims, 3 Drawing Sheets

METHOD AND APPARATUS FOR REPAIRING DAMAGED FILM END

BACKGROUND OF THE INVENTION

1. Field of the Invention

The invention relates generally to the field of photography and more particularly to a method and apparatus for repairing a damaged end of a strip of film used in a still camera.

2. Description of the Prior Art

It is well known to provide the leading end a strip of film with a shape or configuration that designed to facilitate loading the film into a camera, and, after exposure, into a photofinishing apparatus. The leading end of the film is also provided with one or more holes or openings that serve to connect the film to a take-up spool in the camera and to film advancing means in the photofinishing apparatus. The photofinishing apparatus may be either a primary processor and/or printer unit or a secondary unit, such as the combined printer/processor manufactured by the Eastman Kodak Company under the trademark "Create-A-Print." Similarly, it is also known to provide the trailing film end with similar holes and with a special shape or configuration to facilitate attaching that end of the film to a spool or core in the cassette or cartridge in which the film is originally provided or in a storage cassette or cartridge in which it is stored after having been processed. If such a film end is torn or otherwise damaged, by the camera or after it is removed therefrom, it is very likely that it cannot be loaded properly into a photofinishing apparatus or attached reliably either to the film advancing means incorporated in such an apparatus or to a spool or winding core in a storage cassette or cartridge.

Recutting the end of the film to replace the damaged section requires a rather complex punch device, particularly if one or more holes are involved. Also, the resulting shortening of the filmstrip may prevent it from performing properly thereafter.

SUMMARY OF THE INVENTION

In accordance with the present invention, a film strip with a damaged end is repaired by severing the strip at a fixed distance from a pre-existing locating hole in the strip to remove the damaged portion and then attaching a replacement end member in the same location by reference to the locating bole. The severing operation can be performed with one jig and the attachment of the replacement member with another jig, or the same jig can be used for both operations. The replacement member is pre-formed with the same edge configuration and hole features as the original film end portion and has a pressure sensitive adhesive in the region thereof that overlaps the end of the strip being repaired. The replacement member is preferably provided on a carrier strip, to which its adhesive region releasably adheres.

Various means for practicing the invention and other advantages and novel features thereof will be apparent from the following detailed description of illustrative preferred embodiments, reference being made to the accompanying drawings.

DESCRIPTION OF THE ILLUSTRATIVE PREFERRED EMBODIMENTS

Figure 1:
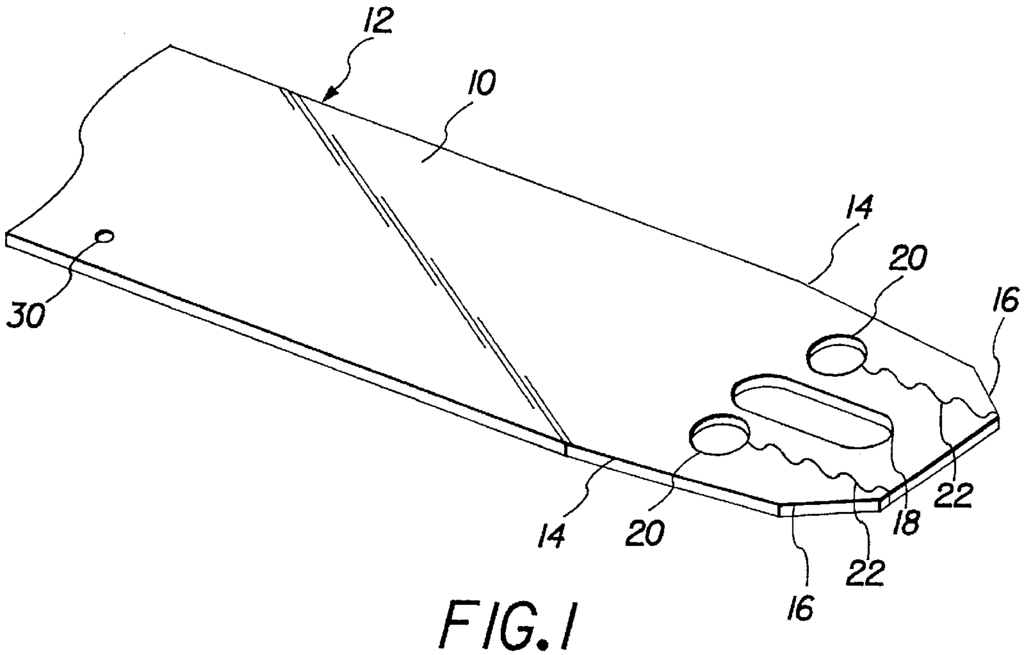
FIG. 1 is a fragmentary perspective view showing the damaged trailing end portion of a strip of film, with holes for attaching it to a spool or winding core.

FIG. 1 shows the trailing end portion 10 of a strip of film 12, which is provided with tapered edges 14, beveled corners 16 and an elongate central hole 18 located between circular holes 20. The tapered edges and beveled corners help guide the end of the film into a slot in the core of a film spool, not shown, and hook members in the slot engage the film holes to lock the end of the film to the core. As shown at numerals 22, the illustrated film is torn between holes 20 and the end of the film.

Figure 2:
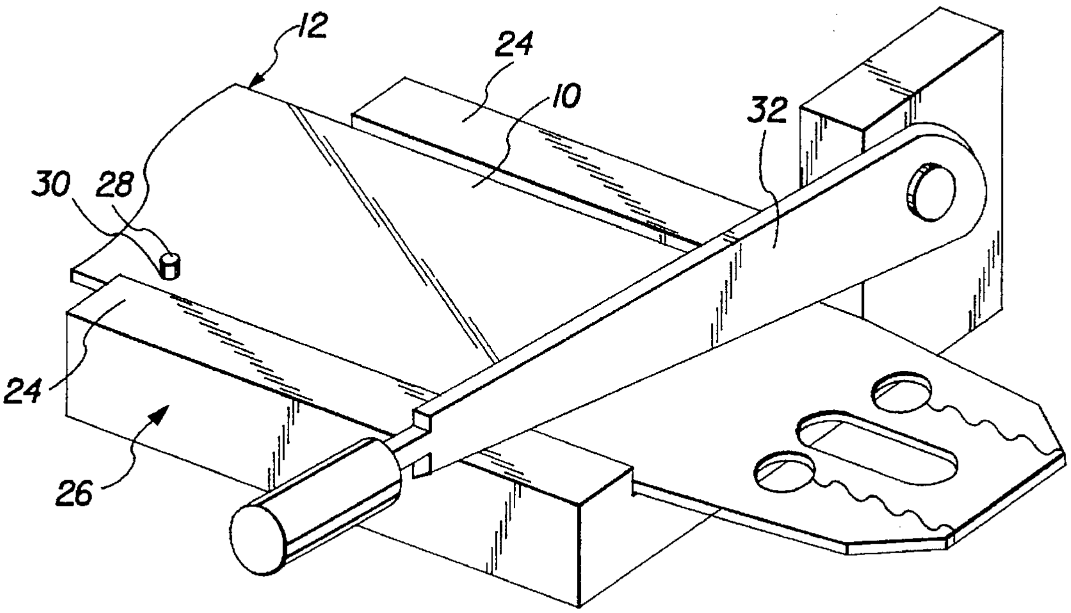
FIG. 2 is a perspective view depicting the damaged end portion of the film strip shown in FIG. 1 being severed in a jig according to the invention.

To repair the illustrated film strip, it laid between side rails 24 of severing jig 26, as shown, in FIG. 2, with locating pin 28 received in pre-existing locating hole 30 in the film. A hinged blade 32, similar to a paper cutter blade, is then used to sever the damaged end portion of the film flush with the corresponding end of the jig.

Figure 3:
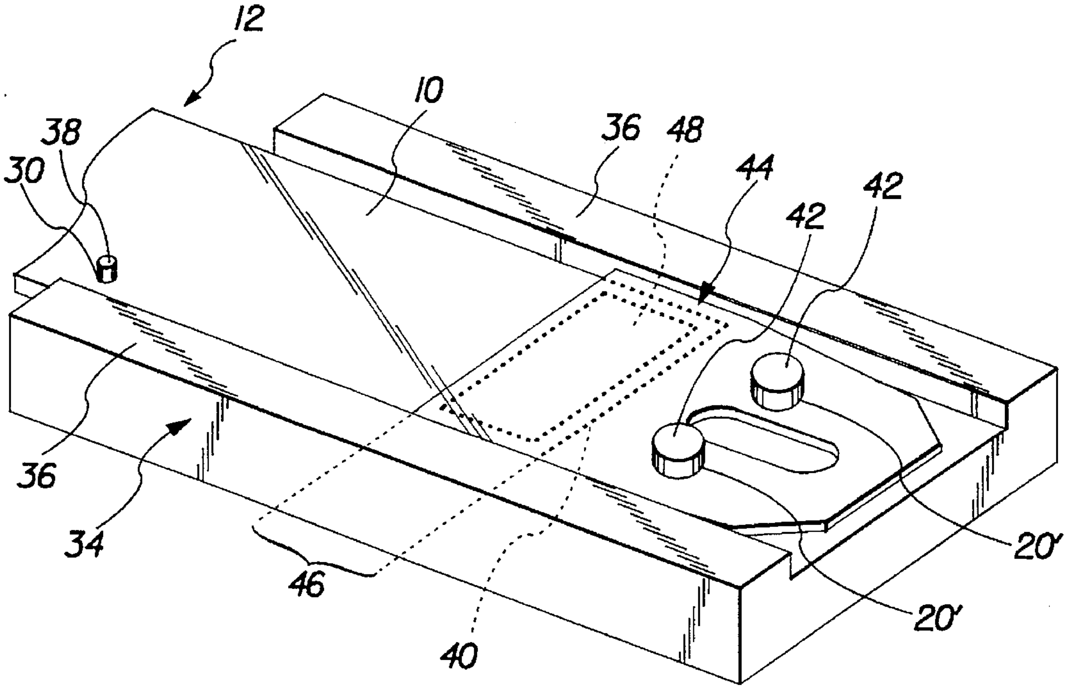
FIG. 3 is a perspective view showing a replacement film end member being applied to the previously severed film strip in a second jig.

After the damaged film end has been removed, the film strip is transferred to a repairing jig 34, as shown in FIG. 3, in which it is received between side rails 36 and located longitudinally by the reception of locating pin 38 in the pre-existing locating hole 30. Beyond the severed end 40 of the film strip, this jig includes a pair of positioning pins 42, which are located at the same position as would be the corresponding circular trailing end holes of an undamaged film strip located in jig 34 with its pre-existing locating hole in engagement with locating pin 38.

Figure 4:
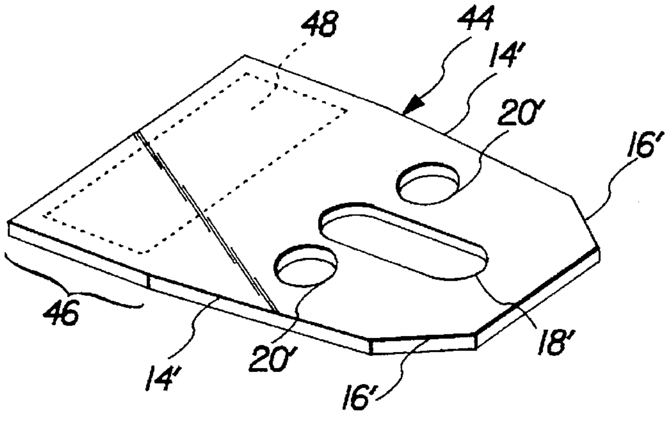
FIG. 4 is a perspective view of a replacement film end member.
Figure 5:
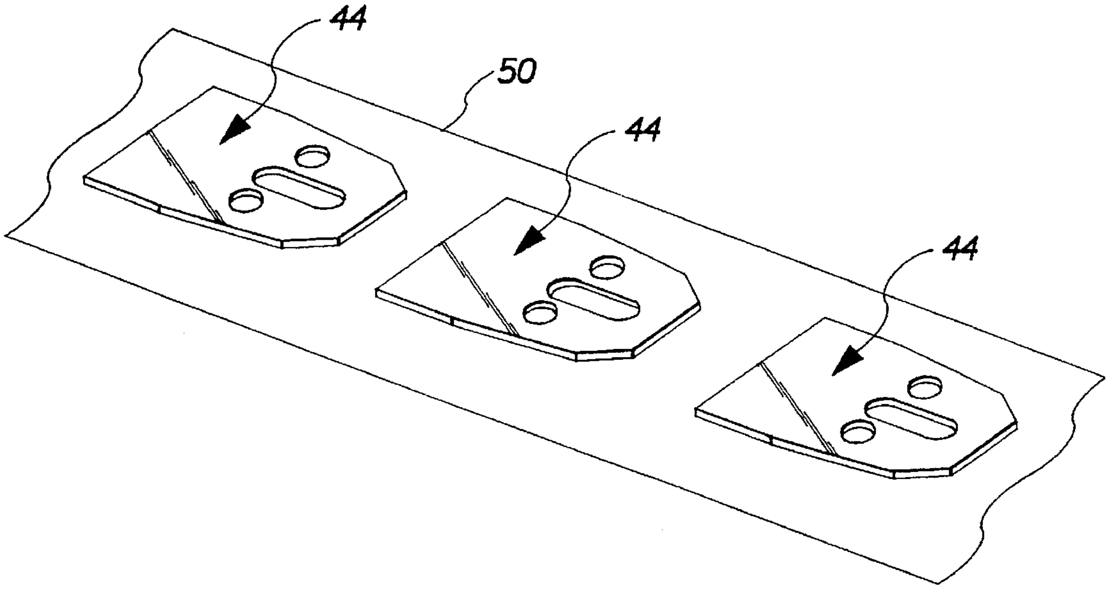
FIG. 5 illustrates several replacement film end members adhered t o a carrier strip.

The replacement film end member 44, best shown in FIG. 4, is made of a thin flexible material such as cellulose acetate or polyethylene terephthalate (PET) and has the same edge and hole configurations as the original film, as shown at the corresponding numerals 14", 16', 18' and 20'. However, the replacement member is somewhat longer than the removed film end portion to provide an overlap portion 46 with a pressure sensitive adhesive material 48 on its lower face. As shown in FIG. 5, the replacement members are preferably supplied on a carrier strip 50, to which such members are releasably attached by their respective adhesive areas. The carrier strip can be provided in various forms for convenient storage and handling, for example, in the form of a roll or folded like tractor feed computer paper.

Referring again to FIG. 3, after the film strip has been cut in jig 26 and positioned in jig 34, a replacement film end member 44 is removed from carrier strip 50 and is placed in jig 34, with the two positioning pins 42 received in the circular replacement member holes 20' and with the pressure sensitive adhesive 48 contacting the end of the film strip overlapped by the replacement member. With his or her finger, the person repairing the film then presses the adhesive portion of the replacement member firmly against the film strip to produce a strong bond. The repaired film strip is then removed from the jig for further use, with the replacement end member exactly reproducing the original shape and length of the film strip.

Figure 6:
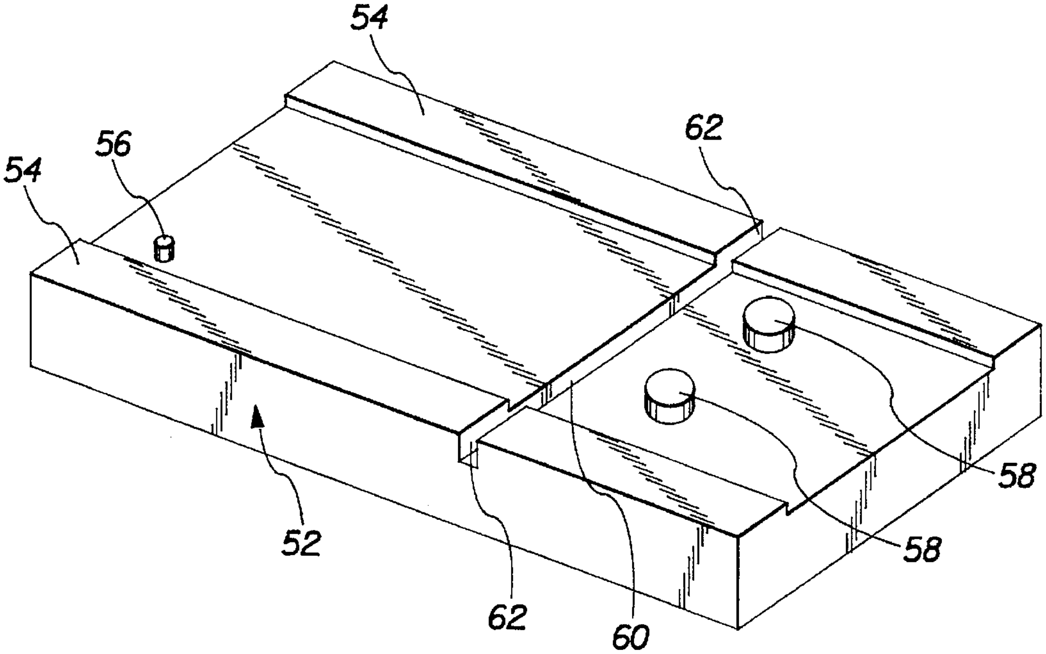
FIG. 6 illustrates another jig for performing both the film severing and the film end replacement operations.

FIG. 6 shows a combination jig 52 that performs both the film severing and the film end replacement operations. With this jig, the damaged film strip is positioned between side rails 54 with locating pin 56 received in the pre-existing locating hole in the film and with positioning pins 58 received in the circular film end holes . A single-edge razor blade or the like is then drawn along groove 60 between side rail notches 62 to sever the film. Thereupon, the damaged film end is removed from the jig and a replacement film end member is installed in the jig with positioning pins 58 received in its circular holes to locate it overlapping relation to the film strip in the same manner previously described in connection with FIG. 2.

Although the invention has been described relation to repairing the trailing end of a film strip, it is equally applicable to repairing damaged leading ends. Also, it should be apparent that the invention can be adapted to repairing the ends of film strips having different edge configurations and/or different hole arrangements.

The invention has been described with reference to illustrative preferred embodiments, but it will be understood that variations and modifications can be effected within the spirit and scope of the invention.

PARTS LIST FOR FIGS.

| Reference No. | Part |
|---|---|
| 10. | Trailing End Portion |
| 12. | Strip of Film |
| 14. | Tapered Edges of Film |
| 14'. | Tapered Edges of Replacement End Member |
| 16. | Beveled Corners of Film |
| 16'. | Beveled Corners of Replacement End Member |
| 18. | Elongate Central Film Hole |
| 18'. | Elongate Replacement Member Hole |
| 20. | Circular Film Holes |
| 20'. | Circular Replacement Member Holes |
| 22. | Tear |
| 24. | Side Rails |
| 26. | Severing Jig |
| 28. | Locating Pin |
| 30. | Preexisting Film Locating Hole |
| 32. | Hinged Blade |
| 34. | Repairing Jig |
| 36. | Side Rails |
| 38. | Locating Pin |
| 40. | Severed End |
| 42. | Positioning Pins |
| 44. | Replacement Film End Member |
| 46. | Overlap Portion |
| 48. | Pressure Sensitive Adhesive |
| 50. | Carrier Strip |
| 52. | Combination Jig |
| 54. | Side Rails |
| 56. | Locating Pin |
| 58. | Positioning Pins |
| 60. | Groove |
| 62. | Rail Notches |

What is claimed is:

1. In combination, an apparatus and an end replacement member for repairing a strip of film with a locating hole along one edge and with a damaged end portion having tapered lateral edges and, prior to being damaged, at least one connecting hole near the end thereof for connecting said strip to a film spool core, characterized by:

severing jig means including a locating pin receivable in said locating hole in said strip of film to locate said strip longitudinally and severing location defining means for defining a film severing location at a predetermined distance from said locating hole to allow said damaged end portion to be severed from said strip;

said end replacement member made of flexible plastic material, said member having the same tapered lateral edge and connecting hole configuration as the severed portion of said strip had prior to being damaged, but being somewhat longer than said severed portion at the end opposite said connecting hole to provide an overlap region the same width as said film strip;

repairing jig means including a locating pin receivable in said locating hole in the undamaged portion of said severed strip of film to locate the latter longitudinally and at least one positioning pin receivable in a connecting hole in said member to longitudinally position said member in the same location relative to said undamaged portion of said severed strip as that originally occupied by said severed end portion but with said overlap region of said member overlapping the adjacent end of said undamaged portion of said strip to permit adhesive bonding of said member to said end of said strip.

2. The invention of claim 1 in which said end replacement member includes two circular connecting holes at opposite sides of a central elongate hole, said repairing jig means including two positioning pins receivable respectively in corresponding ones of said circular connecting holes to locate said member relative to said undamaged portion of said severed film strip.

3. The invention according to claim 1 in which said severing jig means and said repairing jig means are separate devices.

4. The invention according to claim 1 in which said severing jig means and said repairing jig means are combined in the same device.

5. The invention according to claim 1 in which said apparatus includes severing means for severing said film at said film severing location.

6. The invention of claim 1 in which said overlap region of said replacement material is provided with pressure sensitive adhesive material.

7. The invention of claim 1 in which said repairing jig means includes a pair of parallel side rails spaced apart by a distance only slightly greater than the width of said strip of film and the overlap region of said end replacement member to align the severed end of the undamaged portion of said strip of film with said overlap region of said member.

* * * * *